United States Patent
Ganev et al.

(10) Patent No.: US 8,344,705 B2
(45) Date of Patent: Jan. 1, 2013

(54) METHOD AND APPARATUS FOR LEAD-UNITY-LAG ELECTRIC POWER GENERATION SYSTEM

(75) Inventors: Evgeni Ganev, Torrance, CA (US); William Warr, Glendale, CA (US); Mohamed (Arif) Salam, Torrance, CA (US)

(73) Assignee: Honeywell International Inc., Morristown, NJ (US)

( * ) Notice: Subject to any disclaimer, the term of this patent is extended or adjusted under 35 U.S.C. 154(b) by 669 days.

(21) Appl. No.: 12/555,987

(22) Filed: Sep. 9, 2009

(65) Prior Publication Data

US 2011/0060473 A1    Mar. 10, 2011

(51) Int. Cl.
H02P 11/00 (2006.01)
H02P 9/00 (2006.01)

(52) U.S. Cl. .......................................................... 322/37

(58) Field of Classification Search ................... 322/37, 322/44, 24, 20; 361/37; 700/287
See application file for complete search history.

(56) References Cited

U.S. PATENT DOCUMENTS

| | | | | |
|---|---|---|---|---|
| 3,412,317 A | * | 11/1968 | Williamson et al. | 363/149 |
| 3,560,835 A | * | 2/1971 | Rettig | 363/10 |
| 4,355,274 A | * | 10/1982 | Bourbeau | 318/812 |
| 5,239,251 A | * | 8/1993 | Lauw | 318/767 |
| 6,825,640 B1 | | 11/2004 | Hill et al. | |
| 6,984,897 B2 | | 1/2006 | Skeist et al. | |
| 7,042,110 B2 | | 5/2006 | Mikhail et al. | |
| 7,508,086 B2 | | 3/2009 | Huang et al. | |
| 2003/0169014 A1 | * | 9/2003 | Kadah | 318/727 |
| 2004/0145356 A1 | * | 7/2004 | Kalman et al. | 322/46 |
| 2007/0001635 A1 | * | 1/2007 | Ho | 318/254 |
| 2008/0140226 A1 | * | 6/2008 | Ganev | 700/30 |
| 2009/0096212 A1 | | 4/2009 | Turner et al. | |
| 2011/0254379 A1 | * | 10/2011 | Madawala | 307/104 |

FOREIGN PATENT DOCUMENTS

JP    2008199865 (A)    8/2008

* cited by examiner

*Primary Examiner* — Julio C. Gonzalez
(74) *Attorney, Agent, or Firm* — Shimokaji & Assoc., PC

(57) ABSTRACT

A method employing a lead-unity-lag adjustment on a power generation system is disclosed. The method may include calculating a unity power factor point and adjusting system parameters to shift a power factor angle to substantially match an operating power angle creating a new unity power factor point. The method may then define operation parameters for a high reactance permanent magnet machine based on the adjusted power level.

2 Claims, 6 Drawing Sheets

| PARAMETER | UNITS | DESCRIPTION | VALUE |
|---|---|---|---|
| $P_{Load}$ | kW | OUTPUT POWER AT THE LOAD | 150 |
| $\eta_{pe}$ | % | EFFICIENCY OF THE POWER ELECTRONICS | 95 |
| $\eta_m$ | % | EFFICIENCY OF THE ELECTRICAL MACHINE | 93.5 |
| $V_{DC}$ | VOLTS | OUTPUT DC VOLTAGE | 270 |
| $SC_{factor}$ | % | MAX. SHORT-CIRCUIT DC CURRENT ABOVE MAX. OPERATING CURRENT | 40 |
| $V_T$ | Vrms, L-N | MACHINE TERMINAL VOLTAGE | 100 |
| $E_{EMF}$ | Vrms, L-N | MACHINE BEMF VOLTAGE | 130 |
| FREQUENCY | Hz | MACHINE ELECTRICAL FREQUENCY | 1000 |
| $X_S$ | Ohms | MACHINE REACTANCE | 0.226 |

FIG. 6

METHOD AND APPARATUS FOR LEAD-UNITY-LAG ELECTRIC POWER GENERATION SYSTEM

GOVERNMENT RIGHTS

This invention was made with government support under grant number NAS8-01098 awarded by the NASA. The government has certain rights in the invention.

BACKGROUND OF THE INVENTION

The present invention generally relates to power generation systems, and more particularly, to a method and system employing a lead-unity-lag power factor operation of a power generation system for a DC power bus.

Power generation systems (PGS) play a significant role in the modern aerospace/military industry. This is particularly true in the area of more electric architecture (MEA) for aircraft, spacecraft, and electric hybrid technology in military ground vehicles. The commercial aircraft business is moving toward MEA having no bleed-air environmental control systems (ECS), variable-frequency (VF) power distribution systems, and electrical actuation. A typical example is the Boeing 787 platform. In the future, next-generation commercial aircraft may use MEA. Some military aircraft already utilize MEA for primary and secondary flight controls among other functions. Future space vehicles may require electric power generation systems for thrust vector and flight control actuation. Military ground vehicles have migrated toward hybrid electric technology, where the main propulsion is performed by electric drives. Therefore, substantial demand for increased power generation in that area has emerged. These systems should be more robust and offer greatly reduced operating costs and safety compared to the existing Space Shuttle power systems.

These new aerospace and military trends have significantly increased electrical power generation needs. The overall result has been a significant increase in the challenges to accommodate electrical equipment to the new platforms. This has led to increased operating voltages and efforts to reduce system losses, weight, and volume. A new set of electrical power quality and electromagnetic interference (EMI) requirements has been created to satisfy system quality and performance. One of the latest developments of machines under MEA themes is the energy efficient aircraft where electric power and heat management go hand to hand. Therefore, overall system performance improvement and more specifically, power density increase may be necessary for the new-generation hardware.

As can be seen, there is a need for a method and system to improve power generation in aircraft.

SUMMARY OF THE INVENTION

In one aspect of the present invention, a method employing a lead-unity-lag power factor adjustment on a power generation system comprises defining standard parameters for the power generation system; determining a power factor angle for the power generation system based on a power level defined in the standard parameters; calculating a unity power factor point based on the standard parameters; defining an operating power angle based on the unity power factor point; adjusting the power generation system standard parameters to shift the power factor angle to substantially match the operating power angle; and defining operation parameters for the power generation system based on-the unity power factor point.

In another aspect of the present invention, a method for moving a unity power factor point in a power generation system comprises determining operation parameters for the power generation system; generating a phasor diagram representing operation of the power generation system according to the operation parameters; defining a first vector representing a voltage terminal for the power generation system; defining a first angle based on a distance of the first vector from an originating axis, wherein the first angle represents a power factor angle and wherein the originating axis represents a phase current reference vector for the power generation system; defining a second vector representing an electromagnetic field of the power generation system; defining a second angle from the originating axis, wherein the second angle represents a control angle; defining a third angle between the first vector and the second vector representing a power angle for the power generation system; calculating a reduction in operational power for the power generation system; reducing the power factor angle to cause the first vector to approach the originating axis based on the reduction of the operational power; determining a new unity of power factor point in the power generation system according to the reduced magnitude of the power factor angle; and adjusting the operation parameters for the power generation system according to the new unity of power factor point.

In yet another aspect of the present invention, an electric power generation system comprises a three phase bridge; a DC link capacitor bank operatively coupled to the three phase bridge; an EMI filter operatively coupled to the DC link capacitor bank and a DC bus; a contactor disposed in operative contact between the EMI filter and the DC bus; and wherein power flow in the power generation system is operated at a nominal power level for the system based on a unity of power factor point adjusted upward from a zero power point to the nominal power level. These and other features, aspects and advantages of the present invention will become better understood with reference to the following drawings, description and claims.

BRIEF DESCRIPTION OF THE DRAWINGS

FIG. 6 is an exemplary table of operating parameters for an EPGS according to an exemplary embodiment of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a method and apparatus for moving the unity power factor point of a leading power factor system from zero power point to a power point where the machine operates predominantly. This operating point can thus, become the nominal power of the system. This means, for operation of a system below this new operating power point, the system may operate with a lagging power factor. Operation above of this power point, the system will operate with a leading power factor. Thus, one may improve the power factor and hence, one may also improve the efficiency of the system about the region where the system operates predominantly.

Figure 1:
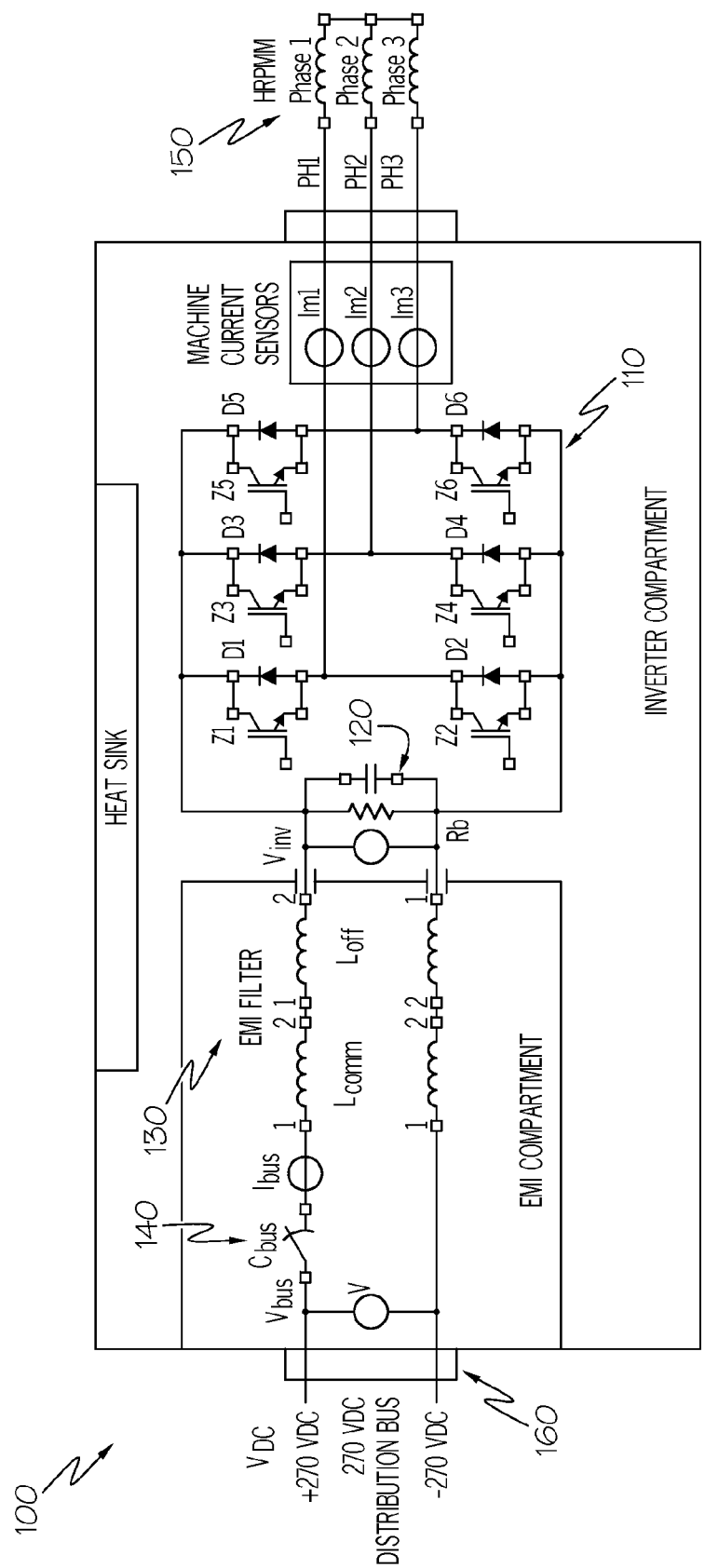
FIG. 1 is diagrammatic illustration of an EPGS topology according to an exemplary embodiment of the present invention.

Referring to FIG. 1, a power topology of an electric power generation system (EPGS) in accordance with one exemplary embodiment of the present invention is shown. An exemplary EPGS used for an MEA application may be a high-reactance permanent magnet machine (HRPMM) 150. The topology depicts a three-phase bridge 110, a DC link capacitor bank 120, an EMI filter 130 for a DC bus, and a contactor 140. It should be understood that current and voltage measurement devices for control and protection purposes are shown for illustrative purposes. The contactor 140 may be an optional component for all applications. This exemplary topology has bidirectional power flow capability by applying an appropriate voltage to the machine terminals. A synchronous rotation of the HRPMM 150 may be performed for continuous motoring or self-starting. Power generation may actively regulate DC bus voltage to a desired value.

One feature of this system provides a short-circuit current at the DC bus during generation to clear a fault. If the DC bus 160 is overloaded, the EPGS 100 may reduce the output voltage linearly to prevent components from overloading. Below certain voltage levels, a pure diode rectification may be used to supply desired current. The reactance of the electric machine 150 may be selected such that the short circuit of the electric power generation system 100 satisfies requirements of a DC bus short circuit current. One typical ratio between the DC bus short circuit current and the electric machine 150 short circuit current may be described as: $I_{DCSC}=1.35*I_{SC}$, wherein $I_{DCSC}$ is the DC bus short circuit current and ISC is the system short circuit current. The ratio may vary depending on component selection for the three phase bridge 110 and the electro-magnetic interference (EMI) filter 130. When a short circuit occurs within the power electronics 110, the HRPMM 150, or the interface between the HRPMM 150 and the power electronics 110, control of the generation process may be instantly discontinued. The failure current may be limited by the HRPMM 150 and may be comparable to the operating current.

Figure 2A:
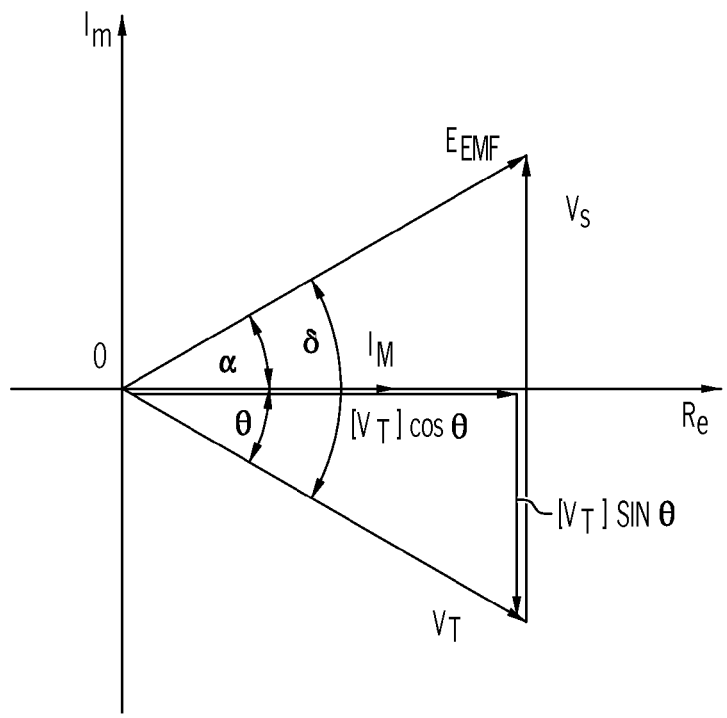
FIG. 2A is a phasor diagram illustrating qualitative representations of an operation of an EPGS under prior art operating conditions.
Figure 2B:
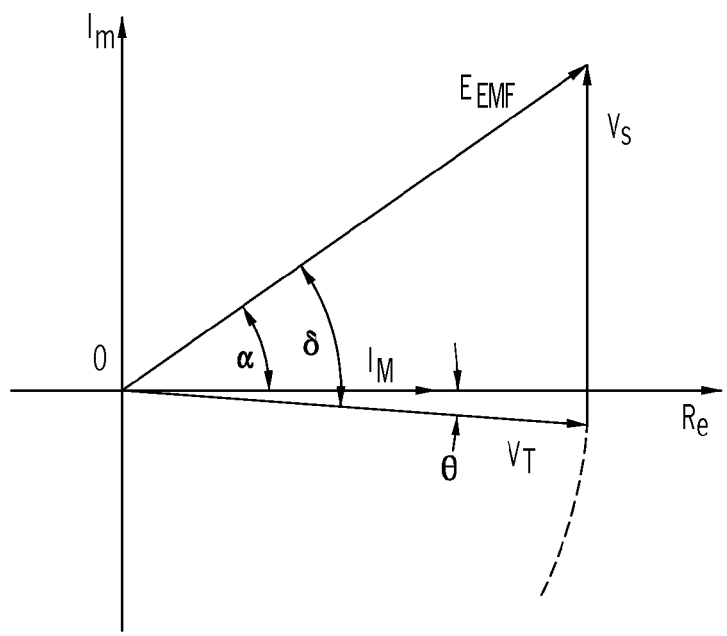
FIG. 2B is a phasor diagram illustrating qualitative representations of an operation of an EPGS according to an exemplary embodiment of the present invention.

Referring to FIGS. 2A and 2B, phasor diagrams of the HRPMM 150 operation in a complex plane may be used for sake of illustration and for providing qualitative assessments. FIG. 2A depicts a phasor diagram according to conventional operations of a power generation system. FIG. 2B depicts a phasor diagram with an adjusted power of nearly unity power factor according to an exemplary embodiment of the present invention. The phasor diagram of an HRPMM 150 in operation can be created according to the following exemplary equation.

$$V_T = E_{EMF} - I_M * Z_S$$

The phase current vector, $I_M$, is aligned with the real (Re) axis of the complex plane. The leading power factor control is achieved by maintaining the power factor angle ($\theta$)<0 (negative). That means the machine phase current vector is ahead of the terminal voltage vector. The terminal voltage vector, $V_T$, is decomposed to two components real $[V_T]\cos(\theta)$ and imaginary $[V_T]\sin(\theta)$. Another angle $\alpha$, may be the angle between the electromotive force (EMF) voltage and the phase current $I_M$. The power angle $\delta$ defines the angle between the EMF voltage phasor and the terminal voltage phasor. The phasor $V_S=I_M*Z_S$ represents the internal machine (HRPMM 150) voltage drop.

In terms of application to the HRPMM 150, machine shaft power $P_T$ may be expressed as:

$$P_T = 3 * \frac{V_T * E_{EMF} * \sin(\delta)}{X_S},$$

wherein $V_T$ is the terminal voltage, $E_{EMF}$ is the HRPMM 150 back EMF voltage, and $X_S$ is the HRPMM 150 reactance.

Expressing output power may be described as:

$P_{OUT}=P_T*\eta_{pe}*\eta_m$, wherein $P_{OUT}$ is the output power of the HRPMM 150, $P_T$ is the shaft power, $\eta_{pe}$ is the efficiency of power electronics, and $\eta_m$ is the efficiency of the HRPMM 150.

One expression describing the power angle ($\delta$) may be derived from the HRPMM 150 shaft power ($P_T$) and the output power ($P_{OUT}$) according to the following equation:

$$\delta = \sin^{-1}\left(\frac{\left(\frac{P_{out}}{\eta_{pe}*\eta_m}\right)*E_{EMF}*X_S}{3*V_T*E_{EMF}}\right)$$

wherein the variables are described by the aforementioned equations.

In accordance with these equations, one may adjust the power angle ($\delta$) so that the power factor angle ($\theta$) is reduced and the terminal voltage $V_T$ phasor is shifted toward the Re axis of the complex plane. One exemplary result may be seen when comparing FIG. 2A to FIG. 2B where the power angle ($\delta$) approaches the angle $\alpha$. Thus, a unity power factor point of the electric power generation system 100 may be adjusted to operate where the system predominantly operates. Thus, in practice, defining the unity power factor point may be achieved by determining the EPGS 100 characteristic parameters. An exemplary table of input conditions and constraints for an EPGS 100 may be seen in FIG. 6.

Exemplary input conditions as illustrated in the table of FIG. 6 may include parameters 605 which may include a $P_{Load}$ 610, a $\eta_{pe}$ 620, a $\eta_m$ 630, a $V_{DC}$ 640, a $SC_{factor}$ 650, a $V_T$ 660, a $E_{EMF}$ 670, a frequency 680, and a $X_S$ 690. The $P_{Load}$ 610 may represent an output power at a load. The $\eta_{pe}$ 620 may represent an efficiency of power electronics in the EPGS 100. The $\eta_m$ 630 may represent an efficiency of the HRPMM 150. The $V_{DC}$ 640, may represent an output DC voltage in the EPGS 100. The $SC_{factor}$ 650 may represent a maximum short circuit DC current above a maximum operating current in the HRPMM 150. The $V_T$ 660 may represent a HRPMM terminal voltage. The $E_{EMF}$ 670 may represent a back EMF voltage of the HRPMM 150. The frequency 680 may represent the HRPMM 150 electrical operating frequency. The $X_S$ 690 may represent the HRPMM 150 reactance. Thus, in one exemplary operation, adjustment of those parameters may be made to achieve a desired unity power factor point as illustrated in the following exemplary methods.

Figure 3:
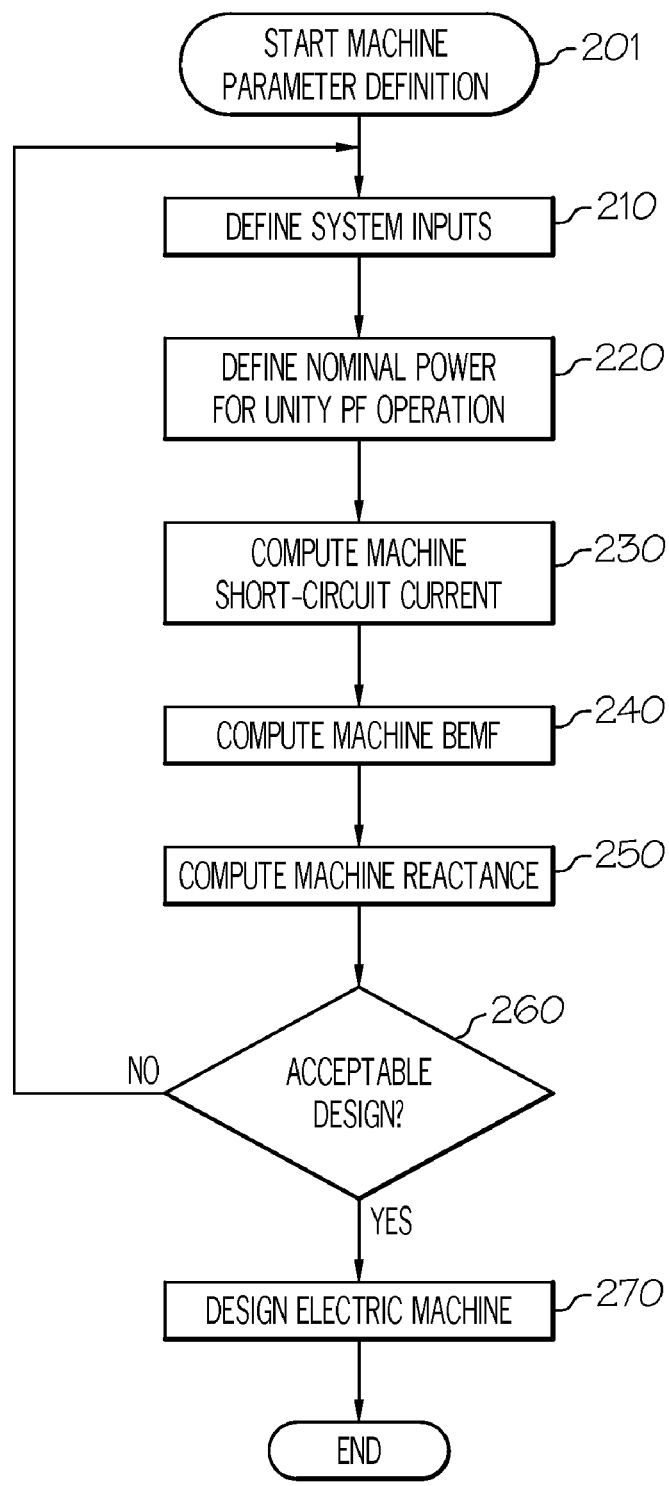
FIG. 3 illustrates a series of steps according to an exemplary embodiment of the present invention.

Referring to FIG. 3, a series of steps illustrate an exemplary method according to the present invention. In step 210, standard system parameters may be defined. Exemplary parameters may be extracted from a table of values such as that one shown in FIG. 6. In step 220, a unity of power factor operating power point may be defined for the system for a given power level based on the extracted system parameters. In step 230, a system short-circuit current may be computed. The short-circuit DC current may be described as $I_{scdc}=(P_{load}/V_{DC})*(1+SC_{factor})$. In step 240, a back EMF ($E_{EMF}$) voltage may be computed for the unity power factor power point. One exemplary equation that may be used to calculate the power factor (PF) as a function of the back EMF ($E_{EMF}$) may be described as:

$$PF(E_{EMF}) = \cos\left(\cos^{-1}\left(\frac{V_T - E_{EMF}*\cos(\delta)}{\sqrt{E_{EMF}^2 + V_T^2 - 2*E_{EMF}*V_T*\cos(\delta)}}\right) - \frac{\pi}{2}\right)$$

wherein the variables are previously described. In step 250, a system reactance may be computed. One exemplary equation describing the system reactance may be described as $X_S=E_{EMF}/I_{sc}$. In step 260, the system parameters may be assessed for controllability. In step 270, a modified HRPMM 150 may be designed based on the parameters obtained from steps 210-250.

Figure 4:
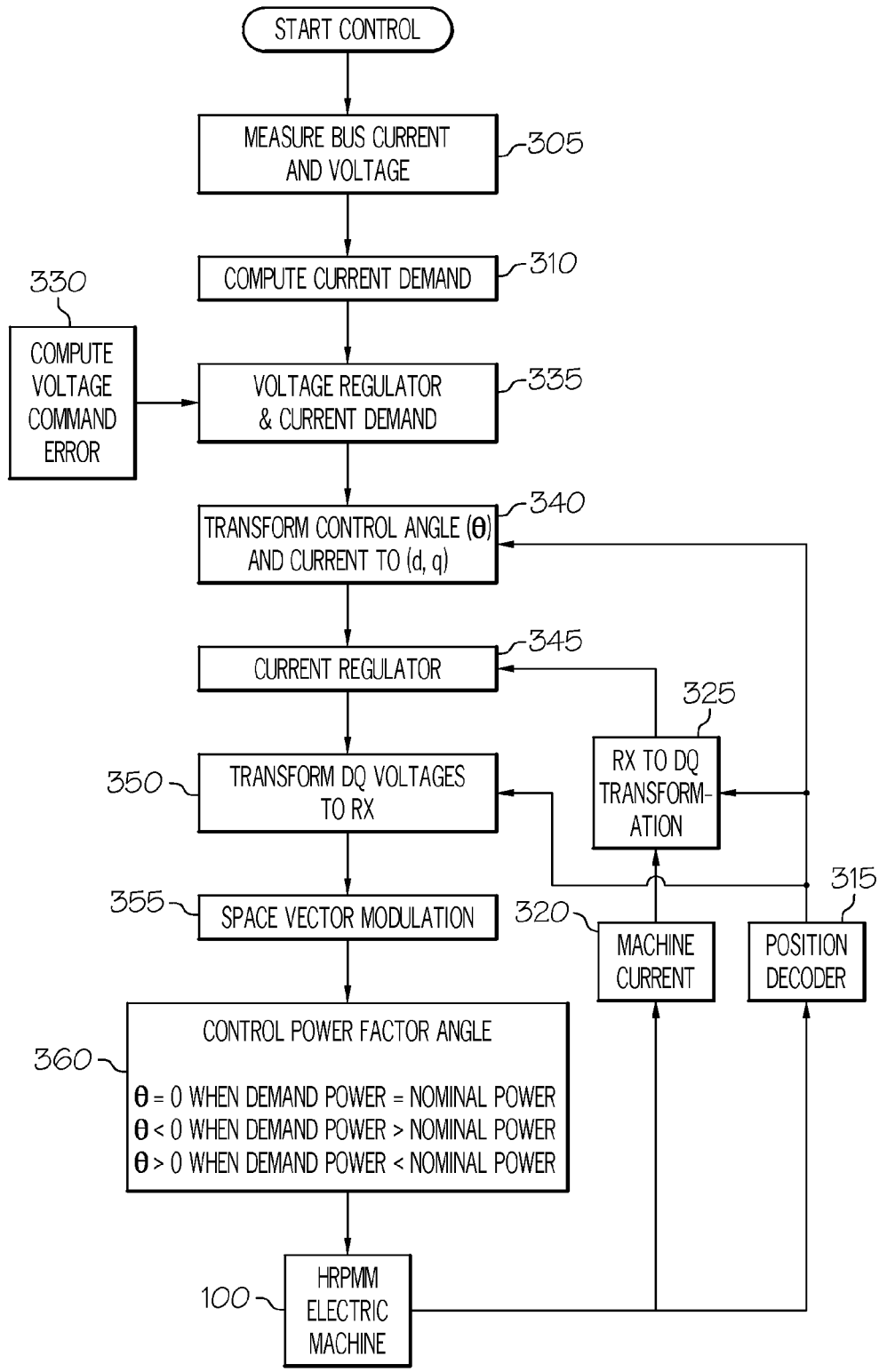
FIG. 4 illustrates a series of steps for controlling an EPGS according to an exemplary embodiment of the present invention.

Referring now to FIG. 4, an exemplary method of controlling the lead-lag-unity power factor is shown according to another exemplary embodiment of the present invention. In step 305, demand power may be computed from a measured bus voltage and current. In step 310, current demand may be computed from a difference between the computed demand power and nominal power. In step 315, a position decoder may be used to measure machine rotor position that may be used for reference frame transformations. In step 320, machine terminal currents may be measured and transformed to a Park vector in the stationary reference frame using the rotor position measured in step 315. In step 325, the current Park vector may be transformed from a stationary reference frame to a synchronous reference frame. In step 330, a voltage command error may be computed. The voltage command error may be computed based on the DC voltage and measured feedback voltage. and DC bus current feedback. In step 335, the voltage command error in step 330 may be regulated, and the regulated voltage error and the DC bus current feedback may be used to compute current command magnitude. In step 340, the current command magnitude and angle may be transformed into a vector in the synchronous reference frame. In step 345, a current command error may be generated from current feedback vector (step 320) and current command vector (step 340) and regulated. The current regulator outputs may be inverter voltage commands. In step 350, the inverter voltage command may be transformed back to the stationary reference frame. In step 355, space vector modulation may be used to transform inverter voltage command to desired machine terminal voltage.

Figure 5:
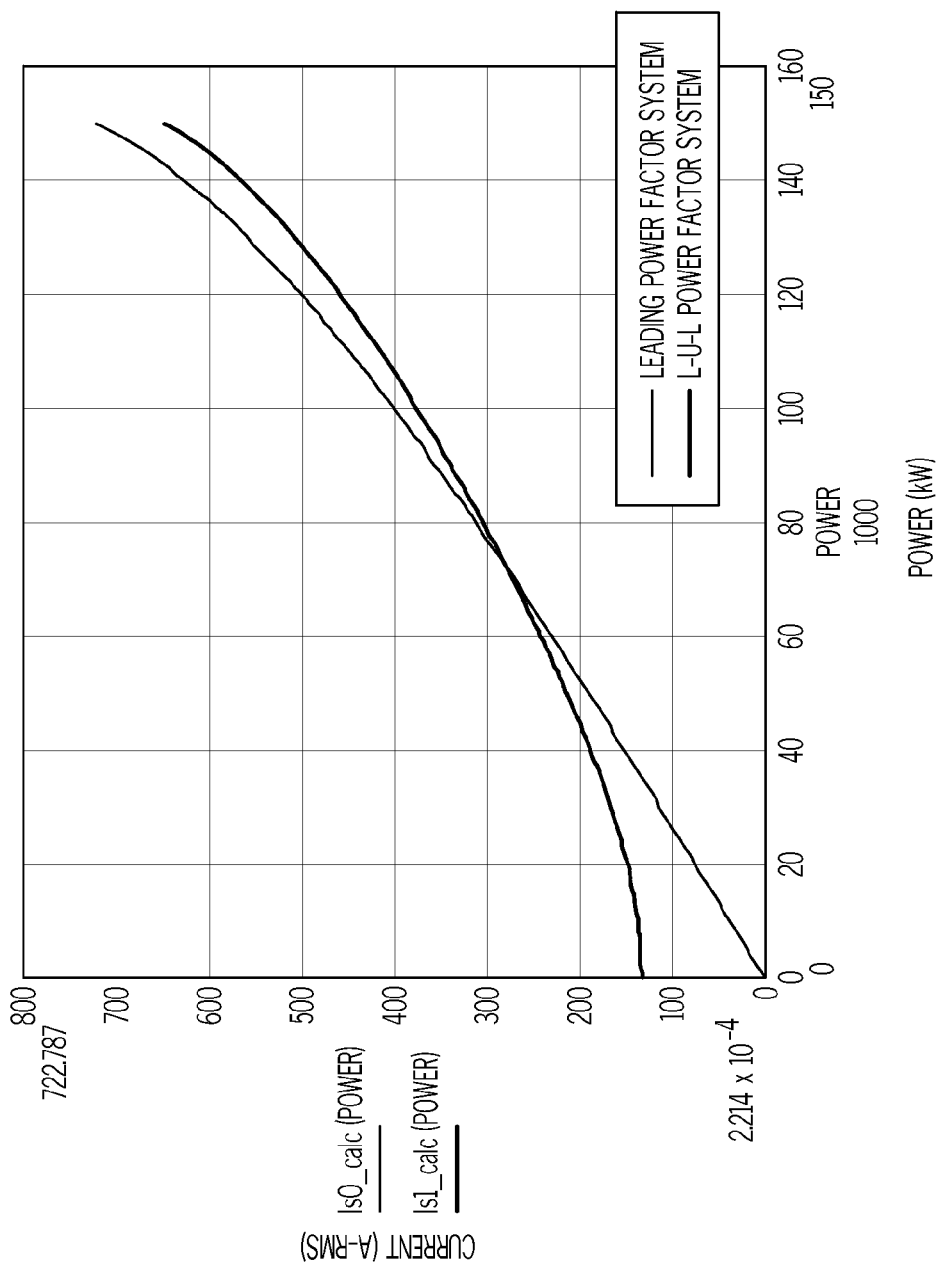
FIG. 5 is a plot depicting a comparative analysis of performance between a conventionally operated EPGS and an EPGS according to an exemplary embodiment of the present invention.

Referring to FIG. 5, exemplary results showing a comparative analysis of machine current employing conventional operation of an electric power generation system against an exemplary operation of the EPGS 100 as a lead-unity-lag system according to an embodiment of the present invention is illustrated. Taking the lead-unity-lag system current as a percentage of the leading system current, it may be seen that the lead-unity-lag system of the EPGS 100 requires 10% lower current at full load than a system under conventional operation. Since the current at full load determines the rating of the system, this may be a significant efficiency improvement. Also, the rating of the three-phase bridge and machine-electronics may be reduced by 10%. Thus, reduced electric machine size and power electronics may be expected.

It should be understood, of course, that the foregoing relates to exemplary embodiments of the invention and that modifications may be made without departing from the spirit and scope of the invention as set forth in the following claims.

We claim:

1. A method employing a lead-unity-lag adjustment on a power generation system, comprising:
    defining standard parameters for the power generation system;
    determining a power factor angle for the power generation system based on a power level defined in the standard parameters;
    calculating a unity power factor point based on the standard parameters;
    defining an operating power angle based on the unity power factor point;
    adjusting the power generation system standard parameters to shift the power factor angle to substantially match the operating power angle;
    defining operation parameters for the power generation system based on the unity power factor point;
    computing a power generation system short circuit current;
    computing a back EMF voltage for the unity power factor point;
    computing an electric machine reactance; and
    designing the power generation system to operate according to the unity of power factor point, the power generation system short circuit current, back EMF voltage for the unity power factor point, and the electric machine reactance.

2. The method of claim 1, wherein the power generation system is a high-reactance permanent magnet machine.

* * * * *